United States Patent
Takahashi et al.

[11] Patent Number: 5,418,286
[45] Date of Patent: May 23, 1995

[54] POLYACETAL RESIN COMPOSITION

[75] Inventors: Tatsuhiro Takahashi, Kanagawa, Japan; Toshikazu Kobayashi, Hockessin, Del.

[73] Assignee: E. I. du Pont de Nemours and Company, Wilmington, Del.

[21] Appl. No.: 55,173

[22] Filed: Apr. 28, 1993

Related U.S. Application Data

[63] Continuation-in-part of Ser. No. 885,574, May 19, 1992, abandoned.

[30] Foreign Application Priority Data

May 23, 1991 [JP] Japan .................. 3-118909

[51] Int. Cl.⁶ ................ C08L 59/02; C08L 59/04
[52] U.S. Cl. ...................... 525/64; 525/154
[58] Field of Search ..................... 525/64, 154

[56] References Cited

U.S. PATENT DOCUMENTS

| | | | |
|---|---|---|---|
| 3,960,984 | 6/1976 | Kohan | 260/857 F |
| 4,098,843 | 7/1978 | Johnson | 260/857 F |
| 4,753,980 | 6/1988 | Deyrup | 524/369 |
| 4,845,161 | 7/1989 | Richardson | 525/399 |
| 5,208,279 | 5/1993 | Katsumata | 524/91 |

FOREIGN PATENT DOCUMENTS

| | | |
|---|---|---|
| 0338303 | 10/1989 | European Pat. Off. |
| 0340926 | 11/1989 | European Pat. Off. |
| 0354802 | 2/1990 | European Pat. Off. |
| 0420564 | 4/1991 | European Pat. Off. |
| 59-64654 | 4/1984 | Japan |
| 59-176342 | 10/1984 | Japan |
| 4-36341 | 2/1992 | Japan |
| 4-036341 | 2/1992 | Japan |

*Primary Examiner*—W. Robinson H. Clark
*Attorney, Agent, or Firm*—Andrea Malinowski

[57] ABSTRACT

Incorporation into polyacetal of 0.01–15 weight percent of certain epoxy-containing polymer compounds, oxazolyl-containing monomer and polymer compounds, and/or styrene acrylonitrile graft polymer compounds yields polyacetal compositions having excellent tensile strength after long-term aging and also after long-term aging in grease. The compositions are useful in automotive and electrical/electronic applications.

5 Claims, No Drawings

POLYACETAL RESIN COMPOSITION

CROSS REFERENCE TO RELATED APPLICATION

This application is a continuation-in-part of U.S. patent application Ser. No. 07/885,574, filed May 19, 1992, now abandoned.

BACKGROUND OF THE INVENTION

The present invention relates to polyacetal compositions containing certain compounds selected from epoxy-containing polymer compounds, oxazolyl-containing monomer and polymer compounds, styrene acrylonitrile graft polymer compounds, and mixtures thereof. The compositions exhibit better long-term heat aging properties and better resistance to grease than polyacetal alone.

Polyacetal resin is manufactured by polymerizing a mostly formaldehyde monomer or a formaldehyde trimer (i.e., trioxane). Examples of polyacetal resin include acetal homopolymer (for example, DuPont Company's Delrin ®) and acetal copolymers, which are obtained by copolymerizing formaldehyde and ethylene oxide.

Polyacetal resin, because of its excellent mechanical properties (such as outstanding repeated fatigue characteristics, abrasion resistance, and wear resistance) and electrical properties is extensively used in automotive and electrical/electronic parts. However, it has been found that, in some cases, the conventional polyacetal resin may not have satisfactory long-term resistance to heat aging (i.e., long-term heat stability) and grease resistance (i.e., long-term oil resistance). With respect to heat aging, it has been found, in some cases, that the conventional polyacetal resin, when exposed to high temperatures of about 120° C. or above over an extended period of time, may fail to maintain certain mechanical properties, such as tensile strength. With respect to oil resistance, it has been found, in some cases, that the conventional polyacetal resin, while resistant to gasoline and lubricants at moderate temperatures (about 80° C.), may behave as if corroded by gasoline and lubricants at higher temperatures (about 100° C. or above).

U.S. Pat. Nos. 4,098,843 and 4,845,161 teach ways to improve on the long-term aging characteristics of polyacetal by incorporating therein antioxidants or heat stabilizers (for example, polyamides or polycarbodiimides), but sufficient improvement in properties has not been attained.

Thus, the present invention is aimed at providing a polyacetal resin composition with improved resistance to long-term heat aging and to long-term grease exposure. Extensive studies by the present inventors have led to the discovery that incorporation into a polyacetal resin of certain compounds selected from epoxy-containing polymer compounds, oxazolyl-containing monomer and polymer compounds, styrene acrylonitrile graft polymer compounds, and mixtures thereof, provides a polyacetal resin with improved resistance to long-term heat aging and to long-term grease exposure, as compared to polyacetal alone.

SUMMARY OF THE INVENTION

This invention relates to polyacetal compositions comprising (a) 85–99.99 weight percent of an acetal polymer and (b) 0.01–15 weight percent of a compound selected from certain epoxy-containing polymer compounds, oxazolyl-containing monomer and polymer compounds, styrene acrylonitrile graft polymer compounds, and mixtures thereof. The compositions have good long-term aging properties, good grease resistance properties, and are useful in automotive and/or electronic/electrical applications.

DETAILED DESCRIPTION OF THE INVENTION

The compositions of the present invention comprise (a) 85–99.99 weight percent of a polyacetal resin and (b) 0.01–15 weight percent of a polymer compound selected from certain epoxy-containing polymer compounds, oxazolyl-containing monomer and polymer compounds, styrene acrylonitrile graft polymer compounds, and mixtures thereof. Preferably, the compositions of the present invention comprise 90–99.95 weight percent of component (a) and 0.05–10 weight percent of component (b). Most preferably, the compositions of the present invention comprise 95–99.9 weight percent of component (a) and 0.1–5 weight percent of component (b). All weight percents in this paragraph are based upon the total weight of components (a) and (b) only.

The component (a) polyacetal used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a DuPont PSM bimodal column kit with nominal pore size of 60 and 1000. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer, or a mixture thereof. Copolymers can contain one or more comonomers, such as those generally used in preparing polyacetal compositions. Comonomers more commonly used include alkylene oxides of 2–12 carbon atoms and their cyclic addition products with formaldehyde. The quantity of comonomer will not be more than 20 weight percent, preferably not more than 15 weight percent, and most preferably about 2 weight percent of the copolymer. The most preferred comonomer is ethylene oxide. Generally acetal homopolymer is preferred over acetal copolymer because of its greater stiffness and strength. Preferred acetal homopolymers include those whose terminal hydroxyl groups have been endcapped by a chemical reaction to form ester or ether groups, preferably acetate or methoxy groups, respectively.

The component (b) compound is selected from certain epoxy-containing polymer compounds, oxazolyl-containing monomer and polymer compounds, styrene acrylonitrile graft polymer compounds, and mixtures thereof. The component (b) compound may be of high or low molecular weight, may be a monomer, a homopolymer, a copolymer, or a terpolymer, and may contain more than one of the functional groups (i.e., epoxy, oxazolyl, and acrylonitrile) given above.

Examples of suitable epoxy-containing polymer compounds include styrene glycidyl methacrylate ("St-GMA") copolymer, ethylene glycidyl methacrylate ("EGMA") copolymer, and terpolymer compounds of the formula E/X/Y, wherein E is ethylene, X is selected from methyl acrylate, ethyl acrylate, butyl acrylate, and vinyl acetate, and Y is selected from glycidyl methacrylate and glycidyl acrylate. The weight ratio of styrene to glycidyl methacrylate in St-GMA preferably ranges from 55:45 to 99:1. The average molecular weight of the St-GMA copolymer preferably ranges from 5,000 to 500,000, more preferably from 50,000 to 350,000, and most preferably from 100,000 to 250,000. The weight ratio of ethylene to glycidyl methacrylate in EGMA preferably ranges from 55:45 to 99:1. The average molecular weight of the EGMA preferably ranges from 3,000 to 1,000,000, more preferably from 5,000 to 300,000, and most preferably from 10,000 to 100,000. The weight ratio of E/X/Y preferably ranges from 55/35/10 to 99/0.5/0.5. The E/X/Y terpolymer compound is known in the art and is described in U.S. Pat. No. 4,753,980. The preferred epoxy-containing compounds are St-GMA, EGMA, and EBAGMA.

Oxazolyl-containing monomer and polymer compounds contain the oxazoline ring Structure (1), below.

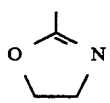

Structure (1)

Examples of suitable oxazolyl-containing polymer compounds include a variety of 2-alkene-2-oxazoline homopolymers and copolymers. The alkene group is preferably a vinyl group or an isopropene group. Specific suitable examples of 2-alkene-2-oxazoline copolymers include random 2-vinyl-2-oxazoline (Compound (2), below)/styrene copolymers; random 2-vinyl-2-oxazoline/methyl methacrylate copolymers; random 2-vinyl-2-oxazoline/styrene acrylonitrile copolymers; random 2-isopropene-2oxazoline/styrene copolymers; random 2-isopropene-2-oxazoline/methyl methacrylate copolymers; random 2-isopropene-2-oxazoline/styrene acrylonitrile copolymers; and the like polymers. The preferred average molecular weight of such oxazoline-containing polymer compounds ranges from 5,000 to 300,000, preferably from 50,000 to 350,000, and most preferably from 100,000 to 250,000. Preferred oxazoline-containing polymer compounds are random 2-vinyl-2-oxazoline/styrene copolymers and random 2-vinyl-2-oxazoline/styrene acrylonitrile copolymers.

Examples of suitable oxazolyl-containing ;monomer compounds include a variety of 2-alkyl-2-oxazolines, such as 2-ethyl-2-oxazoline (Compound (3), below); 2-octyl-2-oxazoline (Compound (4), below); 2-decyl-2-oxazoline; and 2-heptadecyl-2-oxazoline. The oxazoline ring in Structure (1) and in Compounds (2), (3), and (4) may be substituted with conventional substituents.

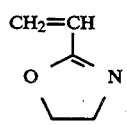

Compound (2)

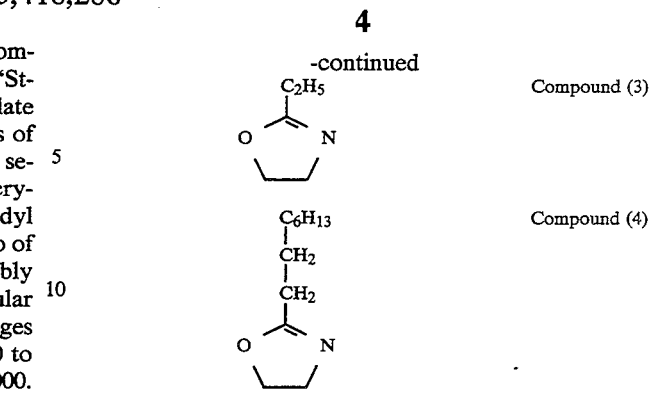

Styrene acrylonitrile ("SAN") graft polymer compounds include polypropylene\SAN graft copolymers; ethylene-vinyl-acetate-copolymer\SAN graft copolymers; ethylene-glycidyl-methacrylate-copolymer\SAN graft copolymers; and E/X/Y\SAN graft copolymers, wherein E/X/Y has been described above. A preferred SAN graft polymer compound is ethylene-glycidyl-methacrylate\SAN graft copolymer.

Component (b) compounds may be used singly or in mixtures of two or more. A preferred mixture for component (b) is an ethylene butyl acrylate glycidyl methacrylate terpolymer and styrene-2-vinyl-2-oxazoline copolymer. The preferred component (b) compounds are the oxazolyl-containing monomers and polymers, whether alone or in combination with another type component (b) mentioned herein. The component (b) compounds are commercially available or can be prepared by techniques readily available to those skilled in the art.

Optionally, within the range of not significantly adversely affecting the properties of the polyacetal resin, additives which are normally added to a polyacetal resin may be incorporated in the polyacetal resin compositions of the present invention. Such additives include, but are not limited to, antioxidants, UV absorbers, heat stabilizers, colorants, mold release agents, nucleating agents, toughening agents, and fillers.

The compositions of the present invention can be prepared by mixing the components together at a temperature above the melting point of the acetal polymer using any intensive mixing device conventionally used in preparing thermoplastic polyacetal compositions, such as rubber mills, internal mixers (such as "Banbury" and "Brabender" mixers), single or multi-blade internal mixers with a cavity heated externally or by friction, "Kokneaders", multibarrel mixers such as "Farrell Continuous Mixers", injection molding machines, and extruders, both single screw and twin screw, both corotating and counter rotating, both intermeshing and non-intermeshing. These devices can be used alone or in combination with static mixers, mixing torpedoes, and-/or various devices to increase internal pressure and/or the intensity of mixing, such as valves, gate, or screws designed for this purpose. Extruders are preferred. Of course, such mixing should be conducted at a temperature below which significant degradation of the polyacetal will occur.

Shaped articles can be made from the compositions of the present invention using any of several common methods, including compression molding, injection molding, extrusion molding, blow molding, rotational molding, melt spinning, and thermoforming. Injection molding is preferred. Examples of shaped articles include sheet, profiles, rod stock, film, filaments, fibers, strapping, tape tubing, and pipe. Such shaped articles can be post treated by orientation, stretching, coating, annealing, painting, laminating, and plating. Such shaped articles and scrap therefrom can be ground and remolded.

Processing conditions used in the preparation of the compositions of the present invention and shaped articles made therefrom include melt temperatures of about 170°–260° C., preferably 185°–240° C., most preferably 200°–230° C. When injection molding the compositions of the present invention, the mold temperature will generally be 10°–120° C., preferably 10°–100° C., and most preferably about 50°–90° C.

EXAMPLES

The components used in the Examples and Control Examples herein are described below. Percent monomer content is based on weight and the portions of copolymer components are based upon weight ratios.

Polyacetal Resin

"PAc H" was an acetal homopolymer containing 0.20% thermal stabilizer and 0.2% antioxidant (manufactured by the DuPont Company; sold as Delrin® 500);

"PAc C" was an acetal/ethylene oxide copolymer (manufactured by Polyplastics Company; sold as Duracon® M90-44).

Compounds Specified in the Invention

"StGMA" was a commercially available random styrene ("St")-glycidyl methacrylate ("GMA") copolymer having an St/GMA ratio of 85/15;

"EGMA" was a commercially available ethylene ("E")-glycidyl methacrylate ("GMA") copolymer having an E/GMA ratio of 95/5;

"EEAGMA" was a random ethylene ("E")-ethyl acrylate ("EA")-glycidyl methacrylate ("GMA") terpolymer having an E/EA/GMA ratio of 85/10/5;

"EBAGMA" was a random ethylene ("E")-butyl acrylate ("BA")-glycidyl methacrylate ("GMA") terpolymer having an E/BA/GMA ratio of 65/30/5;

"EVAGMA" was a random ethylene ("E")-vinyl acetate ("VA")-glycidyl methacrylate ("GMA") terpolymer having an E/VA/GMA ratio of 85/10/5;

"OXAZO-PSt" was a styrene ("St")-2-vinyl-2-oxazoline ("OXZ") copolymer having an St/OXZ ratio of 95/5;

"OXAZO-SAN" was a styrene ("St")-acrylonitrile ("AN")-2-vinyl-2-oxazoline ("OXZ") copolymer having an St/OXZ ratio of 95/5 and an St/AN ratio of 70/30;

"PP-g-SAN" was a polypropylene ("PP")/styrene acrylonitrile ("SAN") graft copolymer having a PP/SAN ratio of 70/30 and a styrene/acrylonitrile ratio of 70/30;

"EVA-g-SAN" was an ethylene-vinyl acetate-copolymer ("EVA")/ styrene acrylonitrile ("SAN") graft copolymer having an EVA/SAN ratio of 70/30 and a styrene/acrylonitrile ratio of 70/30;

"EGMA-g-SAN" was an ethylene ("E")-glycidylmethacrylate ("GMA")-copolymer ("EGMA")/styrene acrylonitrile ("SAN") graft copolymer having an EGMA/SAN ratio of 70/30, a styrene/acrylonitrile ratio of 70/30, and an E/GMA ratio of 85/15.

Control Compounds

"LDPE" was a low density polyethylene having a melt index of 20 g/10 min (ASTM D1238);

"UHMWPE" was an ultra-high molecular weight polyethylene having a molecular weight of about 2 million;

"EVA" was an ethylene-vinyl-acetate copolymer having an ethylene/vinyl acetate ratio of 70/30;

"PEO" was an ethylene oxide homopolymer;

"PMMA" was a polymethyl methacrylate;

"PE-g-PMMA" was a polyethylene CPE")-/polymethyl methacrylate ("PMMA") graft copolymer having a PE/PMMA ratio of 70/30;

"PE-g-PS" was a polyethylene ("PE")/polystyrene ("PS") graft copolymer having a PE/PS ratio of 70/30.

Preparation of Sample Compositions

The components of each sample composition are given in the Tables below. The components of each sample composition were mixed together under standard conditions and then melt compounded in a twin screw extruder to form pellets.

Testing of Sample Compositions

The pellets of the sample compositions were injection molded into ⅛ inch thick, 7 inch length, 0.54 center width dumbbell test pieces, in accordance with ASTM D638. The dumbbell test pieces were subjected to long-term aging tests and grease resistance tests.

The long-term aging test consisted of standing the dumbbell test pieces, for 1,000 hours, in a 135° C. oven and then measuring the tensile strength of the test pieces. Tensile strength was measured in accordance with ASTM D638. The tensile strength of the test piece before aging was also measured.

Grease resistance was evaluated by coating a dumbbell test piece with lithium soap grease (Multemp TA-2), then letting it stand for 1,000 hours in a 135° C. oven. The tensile strength of the piece was then measured, as described above.

EXAMPLES 1–16 AND CONTROL EXAMPLES C1–C9

The components of Examples 1–16 and Control Examples C1–C9, along with test results thereof, are given in TABLE A, below.

The tensile strength of polyacetal H (Control Example C1) was 358 kg/cm$^2$ at 135° C., 1,000 hours of testing. Polyacetal H containing the compounds of Control Examples C2–C8 had tensile strengths less than 358 kg/cm$^2$ at 135° C., 1,000 hours of testing. In contrast, Polyacetal H containing the compounds of the present invention (Examples 1–16) had tensile strengths greater than 358 kg/cm$^2$ at 135° C., 1,000 hours of testing. Further, the compositions of Examples 1–16 exhibited grease resistance at 135° C., 1,000 hours of testing, while the compositions of Control Examples C2–C8 exhibited no grease resistance at 135° C., 1,000 hours of testing. It is noted that molded articles of polyacetal resin, in particular automotive parts and home appliance parts, are often subjected to service temperatures up to 120° C. As such, the 135° C./1,000 hour test environment used herein is more severe than actual service conditions. Nevertheless, the results in TABLE A demonstrate that the resin compositions of the present invention are capable of maintaining excellent strength, even under such severe conditions.

TABLE A

| Example Number | Polyacetal (Wt %) | Compound(s) Added (Wt %) | Tensile Strength (kg/cm²) | | |
|---|---|---|---|---|---|
| | | | Initially | 135° C. 1,000 Hours | With Grease 135° C. 1,000 Hours |
| 1 | 90 PAc H | 10 STGMA | 710 | 700 | 520 |
| 2 | 95 PAc H | 5 EGMA | 675 | 648 | 508 |
| 3 | 90 PAc H | 10 EGMA | 612 | 598 | 499 |
| 4 | 95 PAc H | 5 EEAGMA | 670 | 642 | 512 |
| 5 | 95 PAc H | 5 EBAGMA | 662 | 580 | 501 |
| 6 | 95 PAc H | 5 EVAGMA | 672 | 590 | 476 |
| 7 | 95 PAc H | 5 OXAZO-PSt | 705 | 712 | 605 |
| 8 | 95 PAc H | 5 OXAZO-SAN | 704 | 712 | 620 |
| 9 | 90 PAc H | 10 OXAZO-SAN | 700 | 700 | 654 |
| 10 | 90 PAc H | 10 PP-g-SAN | 642 | 598 | 498 |
| 11 | 95 PAc H | 5 EVA-g-SAN | 658 | 640 | 588 |
| 12 | 95 PAc H | 5 EGMA-g-SAN | 662 | 608 | 580 |
| 13 | 90 PAc H | 10 EGMA-g-SAN | 635 | 588 | 575 |
| 14 | 95 PAc H | 3 EBAGKA 2 EGKA-g-SAN | 645 | 642 | 628 |
| 15 | 95 PAc H | 2 EBAGMA 3 OXAZO-SAN | 678 | 675 | 658 |
| 16 | 95 PAc C | 5 OXAZO-SAN | 594 | 595 | 502 |
| C1 | 100 PAc H | — | 725 | 358 | 0 |
| C2 | 90 PAc H | 10 LDPE | 600 | 150 | 0 |
| C3 | 90 PAc H | 10 UHMWPE | 612 | 150 | 0 |
| C4 | 95 PAc H | 5 EVA | 652 | 150 | 0 |
| C5 | 95 PAc H | 5 PEO | 642 | 315 | 0 |
| C6 | 95 PAc H | 5 PMMA | 675 | 298 | 0 |
| C7 | 95 PAc H | 5 PE-g-PMMA | 612 | 303 | 0 |
| C8 | 95 PAc H | 5 PE-g-PS | 645 | 308 | 0 |
| C9 | 100 PAc C | — | 587 | 600 | 237 |

EXAMPLE 17 AND CONTROL EXAMPLES C10–C11

The components of Example 17 and Control Examples C10–C11 are given in TABLE B, below.

The compositions were tested as described above, except that the test temperatures and test times are as indicated in TABLE B.

Test results, given in TABLE B, show that the tensile strength of polyacetal H (Control Example C10) decreased less significantly, as the temperature increased, with EBAGMA and OXAZO-PSt incorporated therein than without such compounds included therein.

TABLE B

| Example Number | Polyacetal (Wt %) | Compound Added (Wt %) | Tensile Strength (kg/cm²) | | | | |
|---|---|---|---|---|---|---|---|
| | | | Initially | 100° C. 1500 Hours | 120° C. 1500 Hours | 125° C. 1500 Hours | With Grease 100° C. 1500 Hours |
| C10 | 100 PAc H | — | 715 | 720 | 527 | 408 | 709 |
| 17 | 95 PAc H | 3 EBAGMA 2 OXAZO-PSt | 650 | 671 | 629 | 625 | 647 |
| C11 | 100 PAc C | — | 620 | 620 | 547 | 416 | 609 |

We claim:

1. A polyacetal composition comprising
   (a) 85–99.9 weight percent of a polyacetal and
   (b) 0.01–15 weight percent of an oxazolyl-containing monomer or polymer selected from the group consisting of 2-alkyl-2-oxazoline-monomers, 2-alkene-2-oxazoline homopolymers, and 2-alkene-2-oxazoline copolymers,
said weight percents being based upon the weight of components (a) and (b) only.

2. The composition of claim 1 further comprised of a polymer selected from the group consisting of
   (c)(1) styrene glycidyl methacrylate copolymers,
   (c)(2) ethylene glycidyl methacrylate copolymers,
   (c)(3) terpolymers of the formula E/X/Y
wherein E is ethylene, X is selected from methyl acrylate, ethyl acrylate, butyl acrylate, and vinyl acetate, and Y is selected from glycidyl methacrylate and glycidyl acrylate, and wherein the weight ratio of E/X/Y is from 55/35/10 to 99/0.5/0.5, (c)(4) polypropylene/styrene acrylonitrile graft copolymers, and
   (c)(5) ethylene-vinyl-acetate/styrene acrylonitrile graft copolymers.

3. The compositions of claim 1 wherein the 2-alkene-2-oxazoline copolymer is selected from the group consisting of random 2-vinyl-2-oxazoline/styrene copolymers; random 2-vinyl-2-oxazoline/methyl methacrylate copolymers; random 2-vinyl-2-oxazoline/styrene acrylonitrile copolymers; random 2-isopropene-2-oxazoline/styrene copolymers; random 2-isopropene-2-oxazoline/methyl methacrylate copolymers; and random 2-isopropene-2-oxazoline styrene acrylonitrile copolymers.

4. The composition of claim 1 wherein the 2-alkyl-2-oxazoline monomer is selected from 2-ethyl-2-oxazoline; 2-octyl-2-oxazoline; 2-decyl-2-oxazoline; and 2-heptadecyl-2-oxazoline.

5. The composition of claims 1 or 2 further comprising at least one of antioxidants, UV absorbers, heat stabilizers, colorants, mold release agents, nucleating agents, toughening agents, and fillers.

* * * * *